United States Patent
Tabet et al.

(10) Patent No.: US 9,848,347 B2
(45) Date of Patent: Dec. 19, 2017

(54) SYSTEM AND METHOD FOR ADAPTIVE WIRELESS PROPERTY CALCULATIONS

(71) Applicant: APPLE INC., Cupertino, CA (US)

(72) Inventors: Tarik Tabet, San Jose, CA (US); Navid Damji, San Jose, CA (US); Syed Aon Mujtaba, Santa Clara, CA (US); Johnson Sebeni, Fremont, CA (US)

(73) Assignee: APPLE INC., Cupertino, CA (US)

( * ) Notice: Subject to any disclaimer, the term of this patent is extended or adjusted under 35 U.S.C. 154(b) by 134 days.

(21) Appl. No.: 14/496,950

(22) Filed: Sep. 25, 2014

(65) Prior Publication Data

US 2015/0085687 A1 Mar. 26, 2015

Related U.S. Application Data

(60) Provisional application No. 61/882,337, filed on Sep. 25, 2013.

(51) Int. Cl.
| | |
|---|---|
| *H04W 24/08* | (2009.01) |
| *H04L 5/00* | (2006.01) |
| *H04W 52/02* | (2009.01) |
| *H04L 27/26* | (2006.01) |
| *H04L 25/02* | (2006.01) |
| *H04B 7/06* | (2006.01) |

(52) U.S. Cl.
CPC ........... *H04W 24/08* (2013.01); *H04L 5/0048* (2013.01); *H04L 25/022* (2013.01); *H04L 25/0228* (2013.01); *H04L 27/2613* (2013.01); *H04L 27/2655* (2013.01); *H04W 52/0229* (2013.01); *H04B 7/0684* (2013.01); *H04L 5/0023* (2013.01); *H04L 5/0082* (2013.01); *Y02B 60/50* (2013.01)

(58) Field of Classification Search
None
See application file for complete search history.

(56) References Cited

U.S. PATENT DOCUMENTS

| 2005/0249137 | A1* | 11/2005 | Todd | H04W 52/0216 |
| | | | | 370/311 |
| 2009/0092056 | A1* | 4/2009 | Kitazoe | H04W 36/0088 |
| | | | | 370/252 |
| 2011/0307611 | A1* | 12/2011 | Callard | H04L 5/0023 |
| | | | | 709/226 |
| 2012/0257522 | A1* | 10/2012 | Adachi | H04W 76/048 |
| | | | | 370/252 |
| 2013/0182599 | A1* | 7/2013 | Bachl | H04L 25/0232 |
| | | | | 370/252 |
| 2015/0282076 | A1* | 10/2015 | Larmo | H04W 52/0209 |
| | | | | 370/311 |

* cited by examiner

*Primary Examiner* — Charles C Jiang
*Assistant Examiner* — George Atkins, Jr.
(74) *Attorney, Agent, or Firm* — Fay Kaplun & Marcin, LLP

(57) ABSTRACT

A station configured to perform a method for determining a wireless property such as a channel estimate, a channel estimation track, a time tracking loop, and a frequency tracking loop. The method includes determining a set of consecutive subframes in which no transmission is scheduled, placing a processor into a first power mode during at least a portion of the set of consecutive subframes, placing the processor into a second power mode during at least another portion of the set of consecutive subframes, receiving a first reference symbol when the processor is in the second power mode and calculating a wireless property based on the first reference symbol.

20 Claims, 5 Drawing Sheets

SYSTEM AND METHOD FOR ADAPTIVE WIRELESS PROPERTY CALCULATIONS

PRIORITY CLAIM/INCORPORATION BY REFERENCE

This application claims priority to U.S. Provisional Application 61/882,337 entitled "System and Method for Adaptive Wireless Property Calculations," filed on Sep. 25, 2013, the entirety of which is incorporated herein by reference.

BACKGROUND INFORMATION

A station may establish a wireless connection to a wireless communications network using a variety of different hardware and software. During the connection with the network, the station may be required to calculate a variety of wireless properties. For example, channel estimation, a time tracking loop, and a frequency tracking loop are important aspects of a transceiver's physical layer, specifically for the receiver processing to correctly demodulate a transmitted signal.

SUMMARY

In one exemplary embodiment described below, a method is performed by a station. The method includes determining a set of consecutive subframes in which no transmission is scheduled, placing a processor into a first power mode during at least a portion of the set of consecutive subframes, placing the processor into a second power mode during at least another portion of the set of consecutive subframes, receiving a first reference symbol when the processor is in the second power mode and calculating a wireless property based on the first reference symbol.

In a further exemplary embodiment described below, a station includes a transceiver and a processor coupled to a memory. The transceiver is configured to establish a connection to a network and is further configured to receive reference symbols from the network. The processor is programmed to calculate a wireless property by determining a set of consecutive subframes in which no transmission is scheduled, placing the processor into a first power mode during at least a portion of the set of consecutive subframes and placing the processor into a second power mode during at least another portion of the set of consecutive subframes, receiving a first reference symbol when the processor is in the second power mode and calculating a wireless property based on the first reference symbol.

In another exemplary embodiment described below, a non-transitory computer readable storage medium includes a set of instructions executable by a processor. The executing of the instructions causes the processor to determine a set of consecutive subframes in which no transmission is scheduled, place the processor into a first power mode during at least a portion of the set of consecutive subframes, place the processor into a second power mode during at least another portion of the set of consecutive subframes, receive a first reference symbol when the processor is in the second power mode and calculate a wireless property based on the first reference symbol.

DETAILED DESCRIPTION

Figure 1:
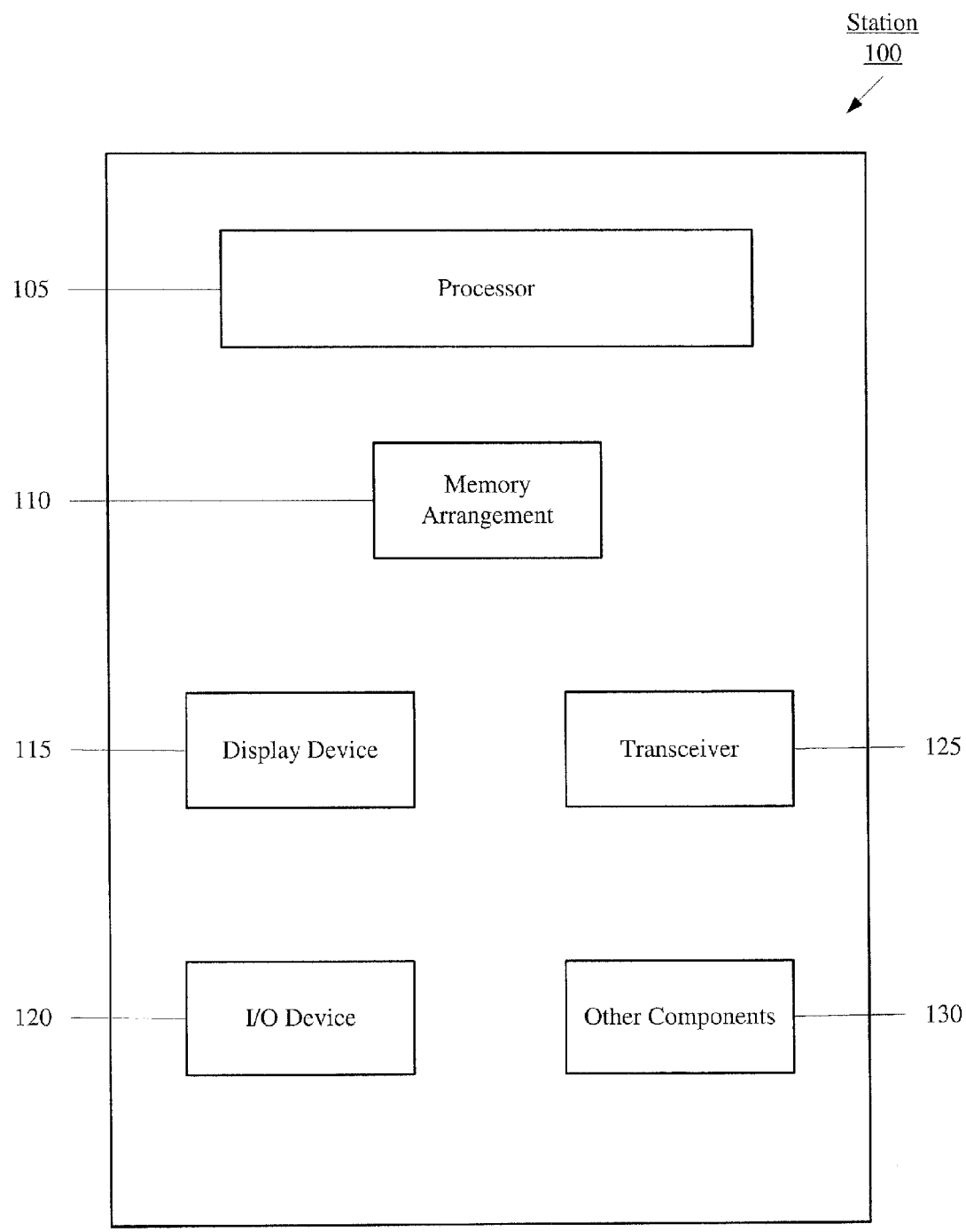
FIG. 1 shows an exemplary station configured to calculate wireless properties while connected to a network.

The exemplary embodiments may be further understood with reference to the following description and the related appended drawings, wherein like elements are provided with the same reference numerals. The exemplary embodiments are related to a system and method for adaptive wireless property calculations. Specifically, a station that has established a connection to a network may receive reference symbols in a defined manner and use these received reference symbols to calculate the wireless properties such as channel estimation, a time tracking loop, a frequency tracking loop, etc. The station, the wireless properties, the reference symbols, the defined manner of receiving the reference symbols, and related methods will be described in further detail below.

A station may establish a connection to a wireless communications network via a base station (e.g., an eNodeB in Long Term Evolution (LTE) networks). To properly be prepared for demodulating transmitted signals (i.e., received signals), the station must be configured with proper settings. Specifically, properties related to the physical layer of the transceiver used to connect to the network must be known. For example, the channel (e.g., band of frequencies) must be known for the incoming signal in order for it to be properly received. While connected to the network, reference symbols are transmitted from a base station of the network to the station. The reference symbols are used as a basis for calculating a variety of wireless properties, for example, for channel estimation.

In specific types of wireless networks such as LTE, the wireless system (e.g., base station and wireless station) may exploit the features of the manner in which the wireless properties are calculated. For example, LTE utilizes a discontinuous reception (DRX). The DRX enables the station to save power when traffic activity is low, in bursts, or periodic. In a specific example, in connected DRX (C-DRX), the station is required to be awake because it is waiting for an acknowledgement signal (ACK). However, under 3GPP specifications, the station does not receive any downlink transmission, thereby removing the need to monitor the physical downlink control channel (PDCCH). It is noted that throughout this description the term "transmission" and its variants may refer to either an uplink transmission (e.g., a signal sent from the station to the base station) or a downlink transmission (e.g., a signal sent from the base station to the station).

During these short gaps in which no transmission is received, the station may utilize a variety of manners to continuously monitor the wireless properties. The station may utilize the different monitoring manners depending on, for example, two properties that may be considered: channel estimation accuracy and power consumption. When channel estimation accuracy is the property to be considered, the power consumption may increase, while when power consumption is the property to be considered, the channel estimation accuracy may decrease. For example, with channel estimation accuracy consideration, the station may continuously receive reference symbols during the entire duration of the gap of no transmission. The processor of the station may also continuously process the reference symbols in order to maximize the channel estimation accuracy. However, with the processor being utilized in this manner, the amount of power consumption increases drastically. In another example, with power consumption consideration, the station may utilize reference symbols that were received prior to the gap of no transmission. In this manner, the processing of reference symbols is not performed during the gap of no transmission. However, with the use of these reference symbols that are received prior to the gap, the accuracy of the channel estimation may be low and may sometimes result in the channel estimation to be incorrect. The exemplary system and method provide a manner for the station to improve channel estimation accuracy while lowering power consumption.

Throughout this description, the exemplary embodiments will be described with reference to an LTE communication network. However, it will be understood by those skilled in the art that the exemplary embodiments may be applicable to other types of wireless communications networks in accordance with the principles described herein. For example, it is not necessary that the wireless communication network include a base station that transmits reference symbols. The exemplary embodiments may be applied to any wireless communication network that includes a network component that transmits communications signals that are used by stations connected to the network to calculate wireless properties.

FIG. 1 shows an exemplary station 100 configured to calculate wireless properties while connected to a network. Specifically, the station 100 may exchange data with a base station of a wireless network and receive reference symbols therefrom. The station 100 may represent any electronic device that is configured to perform wireless functionalities. For example, the station 100 may be a portable device such as a phone, a smartphone, a tablet, a phablet, a laptop, etc. In another example, the station 100 may be a stationary device such as a desktop terminal. The station 100 may include a processor 105, a memory arrangement 110, a display device 115, an input/output (I/O) device 120, a transceiver 125, and other components 130. The other components 130 may include, for example, an audio input device, an audio output device, a battery, a data acquisition device, ports to electrically connect the station 100 to other electronic devices, etc.

The processor 105 may be configured to execute a plurality of applications of the station 100. For example, the applications may include a web browser when connected to a communication network via the transceiver 125. In a specific embodiment, the processor 105 may execute a transceiver application that processes the reference symbols to calculate the various wireless properties. The transceiver application may be executed in a background relative to the user and may also be automatically executed upon a connection with the network. The memory 110 may be a hardware component configured to store data related to operations performed by the station 100. Specifically, the memory 110 may store the reference symbols that are received. The display device 115 may be a hardware component configured to show data to a user while the I/O device 120 may be a hardware component that enables the user to enter inputs. It should be noted that the display device 115 and the I/O device 120 may be separate components or integrated together such as a touchscreen.

The transceiver 125 may be a hardware component configured to transmit and/or receive data. That is, the transceiver 125 may enable communication with other electronic devices directly or indirectly through a network based upon an operating frequency of the network. The transceiver 125 may operate on a variety of different frequencies or channels (e.g., set of consecutive frequencies). Thus, an antenna (not shown) coupled with the transceiver 125 may enable the transceiver 125 to operate on the various frequencies. The transceiver 125 may be used for transmissions that are received from the base station (e.g., the reference symbols) and sent from the station. In a first example, when the browser application is executed, webpage data may be received from the base station. This data may be manually requested by the user. In a second example, the reference symbols may be received from the base station. This data may be automatically received without user intervention.

It should be noted that the exemplary transceiver application does not need to be executed by the processor 105. In another example, the functionality that is described herein for the transceiver application may be performed by the transceiver 125 executing firmware stored on an integrated circuit of the transceiver 125. In a further example, the functionality of the transceiver application may be performed by a separate integrated circuit with or without firmware.

Figure 2A:
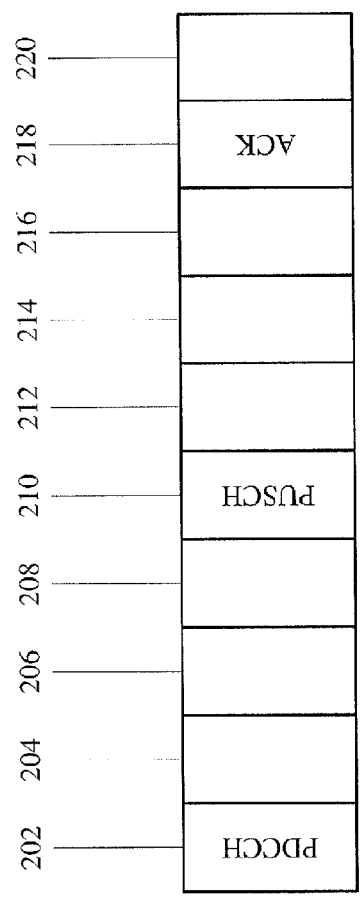
FIG. 2A shows an exemplary traffic activity of the station of FIG. 1 while connected to the network.

FIG. 2A shows an exemplary traffic activity 200 of the station 100 of FIG. 1 while connected to the network. The traffic activity 200 may be a specification that represents a schedule for transmissions of the station 100. Specifically, the traffic activity 200 may be a C-DRX specification as utilized in LTE wireless systems. As illustrated, the traffic activity 200 may include a plurality of subframes 202-220. The subframes 202-220 may represent a 1 millisecond (ms) duration in which an activity is planned or no action is to take place. For example, the subframes including a data transmission may be the subframes 202, 210, 218. Specifically, in subframe 202, a PDCCH transmission may be scheduled to be received; in subframe 210, a Physical Uplink Shared Channel (PUSCH) transmission may be scheduled to be transmitted; and in subframe 218, an acknowledgement (ACK) transmission may be scheduled to be received. The other subframes 204, 206, 208, 212, 214, 216, 220 may be no transmission subframes in which no uplink or downlink is scheduled. Those skilled in the art will understand that in LTE systems utilizing DRX, a frame has a duration of 10 ms. The frame may include a plurality of subframes having equal duration. Specifically, ten subframes having a 1 ms duration may comprise a single frame.

Figure 2B:
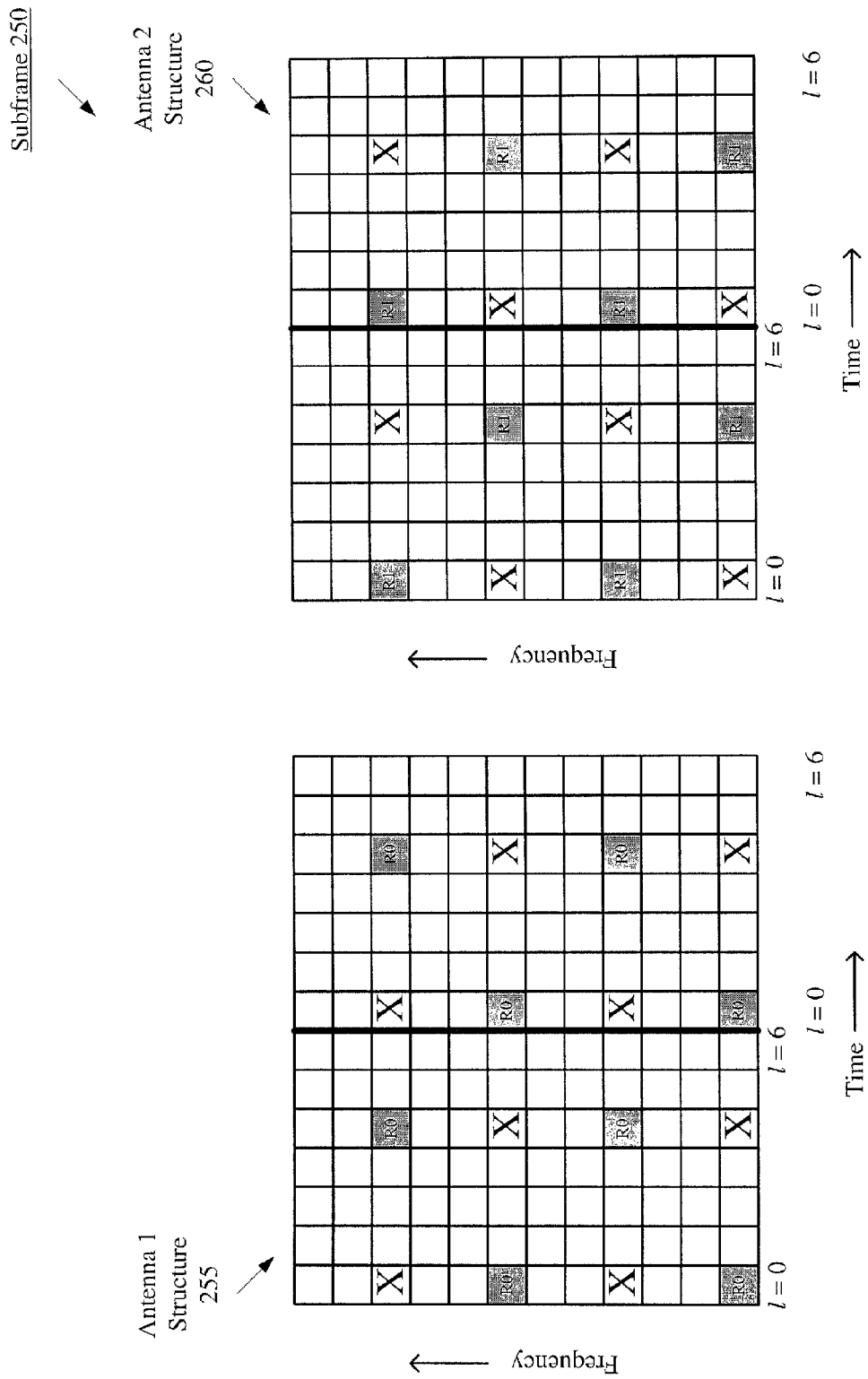
FIG. 2B shows an exemplary subframe of the traffic activity of FIG. 2 while connected to the network.

FIG. 2B shows an exemplary subframe 250 of the traffic activity 200 of FIG. 2A while connected to the network. The subframe 250 may represent one of the subframes 204, 206, 208, 212, 214, 216, 220 in which no transmission is scheduled as indicated by the specification. Accordingly, the subframe 250 may be when reference symbols are being received by the station 100. The subframe 250 illustrated in FIG. 2B relates to a wireless configuration of the station 100 in which two antennas are utilized. It should be noted that with two antennas, the station 100 may include a single transceiver 125 or may include a respective transceiver for each antenna. For example, the two antennas may be an antenna arrangement including a main antenna and a diversity antenna for a single transceiver. In another example, the two antennas may represent two antenna arrangements for two transceivers.

With two antennas, the subframe 250 may include a first antenna structure 255 and a second antenna structure 260. The antenna structures 255, 260 may indicate when a reference symbol is scheduled to be received within the duration of the subframe and the designated frequency at which the reference symbol is to be received at each antenna. The subframe 250 of each of the antenna structures 255, 260 may be divided into two slots, each slot including seven orthogonal frequency-division multiplexing (OFDM) symbols. Accordingly, each slot has a frequency domain spacing of seven OFDM symbols relative to time. There may be a frequency domain staggering of three sub-carriers between the first and second reference symbols in a slot. As illustrated, the reference symbols for the first antenna (as indicated in the first antenna structure 255) may be received within a plurality of predetermined OFDM symbols. Specifically, reference symbols are inserted within the first (l=0) and third to last (l=4) OFDM symbols relative to time at known frequencies. The same is also used for the second slot of the first antenna structure 255. Furthermore, since a second antenna is also present, the first antenna structure 255 has frequencies in the same OFDM symbols of the reference symbols that are blocked out. That is, the reference symbols for the first antenna structure 255 are prevented from transmitting the reference symbols at the blocked out frequencies. The second antenna structure 260 may also indicate where the reference symbols are inserted in a substantially similar manner as the first antenna structure 255. As illustrated, the reference symbols in the second antenna structure 260 are inserted at the blocked out frequencies and at the same time OFDM symbols of the first antenna structure 255. When viewed as a whole (both slots), the reference symbols in the first and second antenna structures 255, 260 are inserted at the zero-th, fourth, seventh, and eleventh OFDM symbols.

Given the above manner in which reference symbols are scheduled to be received by the station 100, the exemplary embodiments may indicate a manner of selecting reference symbols to decrease power consumption in calculating the wireless properties while maintaining a certain level of accuracy with regard to these wireless properties of the physical layer (e.g., channel estimation, time and frequency tracking loops, etc.). As will be described in further detail below, a variety of different manners may be used. In a first example, when the gap of no transmission is less than a predetermined time duration, the reference symbol received in the zero-th OFDM symbol of the first subframe of the gap (first reference symbol of the gap) and reference symbol received in the eleventh OFDM symbol of the last subframe of the gap (last reference symbol of the gap) may be used as the basis for the calculations. In a second example, when the gap of no transmission is greater than the predetermined time duration, the reference symbol received in the zero-th OFDM symbol of the first subframe of the gap, at least one reference symbol received in a OFDM symbol of intermediary subframes of the gap, and the reference symbol received in the eleventh OFDM symbol of the last subframe of the gap may be used as the basis for the calculations. In a third example, the duration of the gap of no transmission may serve as the basis of determining a number of last reference symbols to be used to calculate the wireless properties. That is, the reference symbol preceding the end of the gap of no transmission and possibly at least one immediately previous reference symbol thereto may be used.

Figure 3:
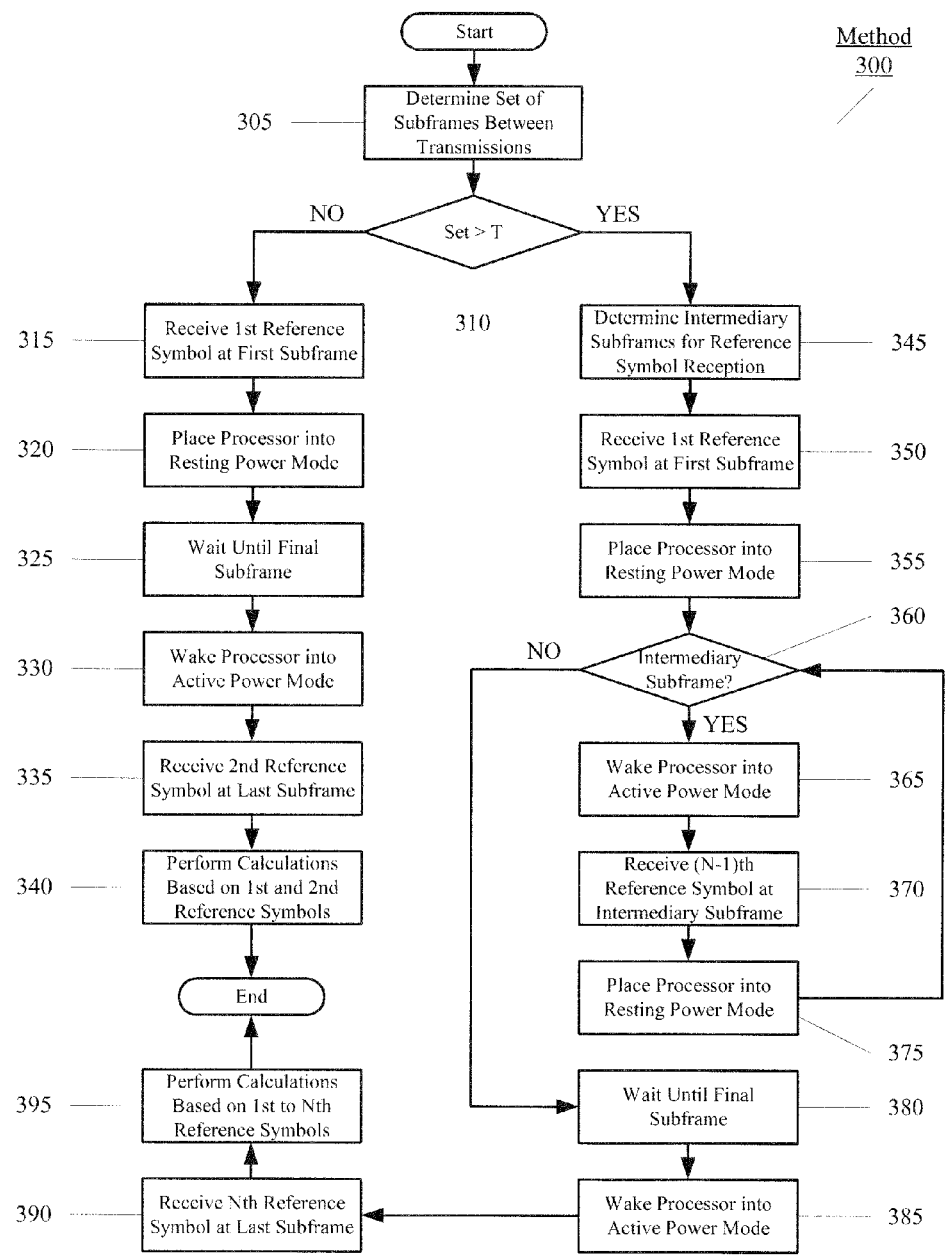
FIG. 3 shows a first exemplary method for determining the wireless properties while connected to the network.

FIG. 3 shows a first exemplary method 300 for determining the wireless properties while connected to the network. Specifically, the first exemplary method 300 relates to the first and second examples discussed above in which the duration of the gap of no transmission is used and the reference symbol of the zero-th OFDM symbol of the first subframe of the gap as well as the eleventh OFDM symbol of the last subframe of the gap is used. The method 300 will be described with regard to the station 100 of FIG. 1, the traffic activity 200 of FIG. 2A, and the subframe 250 of FIG. 2B.

In step 305, the processor 105 determines the set of subframes between scheduled transmissions. As discussed above, the station 100 may be aware of the specification or schedule of transmissions (e.g., traffic activity 200). Accordingly, with a given traffic activity 200, the processor 105 may determine the set of subframes in which no transmissions are scheduled. For example, in the traffic activity 200, the subframe 202 and the subframe 210 have a transmission that is scheduled. Accordingly, the subframes 204, 206, 208 may be a set of subframes between the scheduled transmissions in which no transmission is scheduled. It should be noted that the determination of the set of subframes relates to a set of consecutive subframes between the scheduled transmissions. Thus, one set of subframes determined in this step is for the subframes 204-208. Another set of subframes that may be determined may be for subframes 212-216 between the transmissions of the PUSCH at subframe 210 and the ACK at subframe 218.

In step 310, a determination is made whether the set of subframes has a time duration greater than a predetermined amount. As discussed above, each subframe 202-220 of the time activity 200 may represent 1 ms in time. Accordingly, the set of subframes 204-208 between the scheduled transmissions may be 3 ms in total length. In a specific example, with particular regard to a Voice Over LTE (VoLTE) application, the predetermined amount of time may be 3 ms. Since the duration of the set of subframes is not greater than this predetermined amount of time, the method 300 may continue to step 315. It should be noted that the predetermined amount of time may be based upon a currently executing application such as VoLTE. However, other applications may utilize different predetermined amounts of time.

The following steps relate to the first exemplary embodiment in which a first reference symbol received in the zero-th OFDM symbol of the first subframe of the gap and a second reference symbol received in the eleventh OFDM symbol of the last subframe of the gap are used to calculate the wireless properties. In step 315, the first reference symbol in the zero-th OFDM symbol of the first subframe of the gap is received. The reference symbol received in the zero-th OFDM symbol of the first subframe of the gap of no transmission represents the first opportunity to receive the reference symbol after a scheduled transmission. For example, after the PDCCH is received in subframe 202, the subframe 204 is the first subframe of the gap of no transmission. Within the subframe 204, the zero-th OFDM symbol is when the reference symbol may be received.

In step 320, upon receiving the first reference symbol, the processor 105 may be placed into a resting power mode. The resting power mode may relate to the calculations for the wireless properties. As discussed above, the transceiver application executed by the processor 105 may receive reference symbols in order to perform the calculations. However, according to the exemplary method 300, the processor 105 is placed into this first power mode such that no calculations are being performed for a given duration of time. Therefore, during this gap of no transmission, power consumption may be decreased, as no processing power is required. It should be noted that this first power mode (i.e., resting power mode) may not represent placing the processor 105 to sleep, hibernate, or deactivate. That is, other applications or processes may be performed. The first power mode relates to conserving power by discontinuing a continuous processing by calculating the wireless properties.

In step 325, the processor 105 waits until the final subframe. Since the specification or schedule is known, the processor 105 is aware of when the final or last subframe of the gap of no transmission is reached. In the example discussed above, the processor 105 is aware that the subframe 208 is the last subframe of the gap of no transmission. Thus, after receiving the first reference symbol of subframe 204, the processor 105 is placed into the resting power mode from the first OFDM symbol (ensuing frame after the zero-th OFDM symbol) of the first subframe until this last subframe. Specifically, the processor 105 may be awoken at the eleventh OFDM symbol of the last subframe. Accordingly, power may be conserved as the previous OFDM symbols (zero-th to tenth OFDM symbols) in the last subframe 208 are also a period in which the processor 105 is in the resting power mode. Therefore, the portion of the gap of no transmission in which the processor 105 is placed in the resting power mode may be from the first OFDM symbol of the first subframe 204 until the tenth OFDM symbol of the last subframe 208.

In step 330, the processor 105 is awoken from the resting power mode to an active power mode. The active power mode may represent a second power mode in which calculations of the wireless properties may be performed. In step 335, a second reference symbol in the eleventh OFDM symbol of the last subframe 208 is received. Thus, in step 340, the transceiver application executed by the processor 105 performs the calculations based upon the first reference symbol received in the zero-th OFDM symbol of the first subframe 204 and the second reference symbol received in the eleventh OFDM symbol of the last subframe 208.

Returning to step 310, the set of subframes may have a time duration that is greater than the predetermined amount of time (e.g., 3 ms). For example, the set of subframes may be a relatively longer period such as 10 ms. That is, there may be ten subframes between scheduled transmissions. Since the duration of the set of subframes is greater than the predetermined amount of time, the method 300 may continue to step 345. It should be noted that the predetermined amount of time may be set to any time depending on the particular application. In this example, the time may be set based on the application being a VoLTE application. However, other applications may have different maximum durations for the gap of no transmission. The following steps for this exemplary embodiment are also configured for these other applications.

The following steps relate to the second exemplary embodiment in which a first reference symbol received in the zero-th OFDM symbol of the first subframe of the gap, at least one reference symbol received in a OFDM symbol of the intermediary subframes of the gap, and an Nth reference symbol received in the eleventh OFDM symbol of the last subframe of the gap are used to calculate the wireless properties. It is noted N represents a total number of reference symbols that are used for the calculations. In step 345, the processor 105 determines intermediary subframes in which reference symbols are to be received. In the example discussed above regarding VoLTE, an intermediary subframe may be an X/2 subframe, where X is a total number of subframes of the gap of no transmission. Furthermore, the OFDM symbol in the X/2 frame may be the zero-th OFDM symbol. When the gap of no transmission is 10 ms, there are ten subframes. Therefore, the X/2 frame may be the fifth subframe. The transceiver application may determine that the zero-th OFDM symbol of the fifth subframe is also when the reference symbol is to be received. It should be noted that the use of the zero-th OFDM symbol is only exemplary. The transceiver application may be configured to utilize the reference symbol of any OFDM symbol of the X/2 subframe. For example, when a median reference symbol between the first and last subframes is to be used, the reference symbol may be received from the fourth or seventh OFDM symbol of the X/2 subframe. It should also be noted that the use of the X/2 subframe is only exemplary. As discussed above, other applications may include greater gaps of no transmission. With these greater gaps, the transceiver application may utilize other intermediary subframes. For example, when the gap of no transmission is 15 ms (e.g., 15 frames), reference symbols received in a OFDM symbol of the X/3 and the 2X/3 subframes may be used. That is, more than one intermediary reference symbol may be used.

In step 350, the first reference symbol in the zero-th OFDM symbol of the first subframe of the gap is received in a substantially similar manner as discussed above in step 315. In step 355, the processor 105 is placed into the resting power mode in a substantially similar manner as discussed above in step 320. Once placed into the resting power mode, the processor 105 waits until the first intermediary subframe is reached.

In step 360, a determination is made whether the intermediary subframe has been reached. Using the above example, the intermediary subframe may be the fifth subframe of a 10 ms gap of no transmission. When the intermediary subframe has been reached, the method 300 continues to step 365 in which the processor 105 is awoken into the active mode to receive the intermediary reference symbol (step 370). In step 375, the processor 105 may again be placed into the resting power mode. The method 300 then returns to step 360 such that each intermediary reference symbol may be received in this manner. When each intermediary reference symbol has been received, a total of N−1 reference symbols may be stored in the memory arrangement 110. That is, with N representing the total number of reference symbols to be used for the calculations, these steps provide for N−1 reference symbols to be received. The final N-th reference symbol may be received using the steps described below. Thus, with VoLTE, a total of three reference symbols (N total) may ultimately be received and after these steps, the first and second reference symbols (two total symbols which is N−1) may be received. With other applications such as one having a gap of 15 ms, a total of four reference symbols (N total) may ultimately be received in which the first, second, and third reference symbols (three total symbols which is N−1) have been received after these steps are performed.

Returning to step 360, when there are no further intermediary subframes from which a reference symbol is to be received, the method 300 continues to step 380. In step 380, the processor 105 waits until the final or last subframe has been reached. In step 385, the processor 105 is awoken from the resting power mode into the active power mode. In step 390, the Nth reference symbol in the eleventh OFDM symbol of the last subframe is received. Thus, in step 395, the processor 105 performs the calculations of the wireless properties based upon the first reference symbol received in the zero-th OFDM symbol of the first subframe, the second reference symbol received in the zero-th OFDM symbol of the a first intermediary subframe . . . the N−1 reference symbol received in the zero-th OFDM symbol of the last intermediary subframe, and the Nth reference symbol received in the eleventh OFDM symbol of the last subframe.

It should be noted that the method 300 may include further steps. For example, as discussed above, the predetermined amount of time may be dependent upon the application that is being executed. Thus, a step between steps 305 and 310 may include determining the currently executing application in order to determine the predetermined amount of time to be used in step 310.

Using the method 300, the processor 105 calculating the wireless properties may minimize the software and hardware processing of the station 100 during the gap of no transmission as indicated in the specification. The processor 105 may also minimize the impact on the demodulation/decoding performance on the station 100 by reducing the channel estimation and time/frequency tracking loops processing. With a relatively short gap of no transmission (less than the predetermined amount of time), the use of the first and second reference symbols may save power while still maintaining a standard for accuracy of the channel estimation. With a relatively large gap of no transmission (greater than the predetermined amount of time), the use of further intermediary reference symbols may improve the accuracy of the channel estimation while still conserving power. With longer gaps of no transmission, using only the reference symbols of the first and last frames may result in less accurate channel estimation. Accordingly, the further intermediary reference symbols may be used with the relatively large gaps of no transmission.

Figure 4:
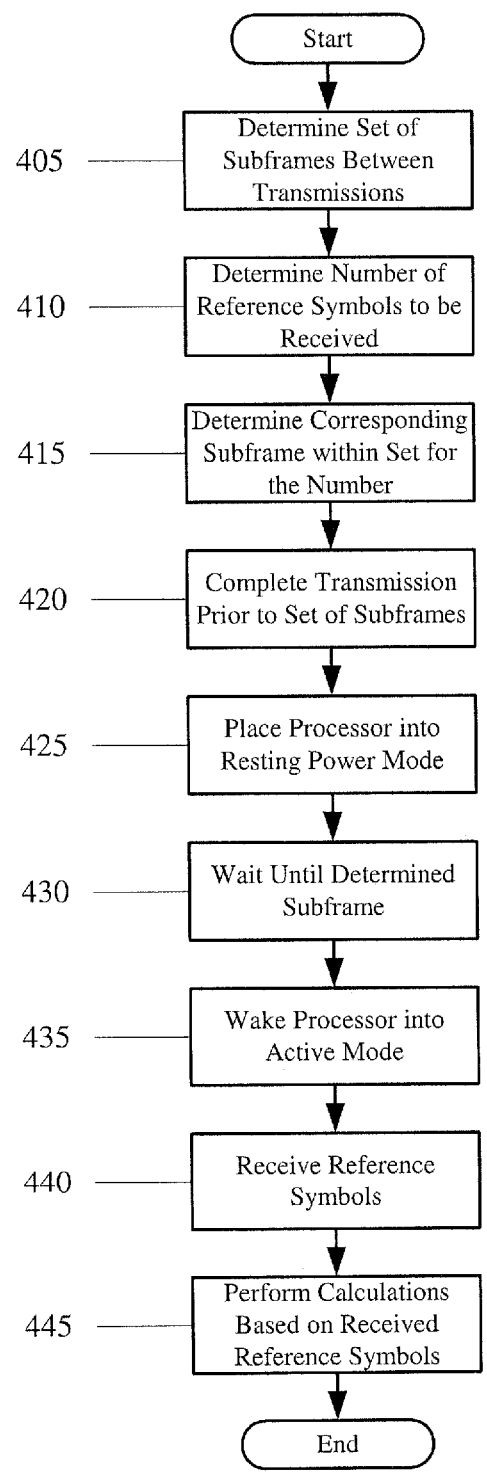
FIG. 4 shows a second exemplary method for determining the wireless properties while connected to the network.

FIG. 4 shows a second exemplary method 400 for determining the wireless properties while connected to the network. Specifically, the second exemplary method 400 relates to the third example discussed above in which the duration of the gap of no transmission serves as the basis for determining a number of final reference symbols that are received. The method 400 will be described with regard to the station 100 of FIG. 1, the traffic activity 200 of FIG. 2A, and the subframe 250 of FIG. 2B.

In step 405, the processor 105 determines the set of subframes between scheduled transmissions in a substantially similar manner as step 305 of the method 300. In step 410, the processor 105 determines the number of reference symbols to be received for the calculations of the wireless properties. The memory arrangement 110 may store a database that indicates a number of reference symbols to be used based upon a range of gap durations. For example, in a relatively very short gap (e.g., 1 ms), only one reference symbol may be used. In another example, in a relatively short gap (e.g., between 1 ms and 3 ms), two reference symbols may be used. In a further example, in a relatively large gap (e.g., between 3 ms and 10 ms), four reference symbols may be used. In yet another example, in a relatively very large gap (e.g., more than 10 ms), five or more reference symbols may be used. In this manner, the processor 105 is aware of the number of reference symbols that are to be used.

In step 415, the processor 105 determines the subframe or subframes in which the number of reference symbols corresponds. As the final reference symbols are to be utilized, the number of reference symbols relates to the reference symbol of the eleventh OFDM symbol of the last subframe and backtracking therefrom. Thus, when the number of reference symbols is two, one of the reference symbols is the reference symbol received in the eleventh OFDM symbol of the last subframe while the other one of the reference symbols is the reference symbol received in the seventh OFDM symbol of the last subframe (the reference symbol immediately prior to the last reference symbol). Accordingly, when one to four reference symbols are to be used, the final subframe of the gap of no transmission will include all four reference symbols, specifically at the zero-th OFDM symbol, the fourth OFDM symbol, the seventh OFDM symbol, and the eleventh OFDM symbol. When a fifth reference symbol is to be used, the immediately prior (second to last) subframe may include this reference symbol, specifically, the eleventh OFDM symbol of the second to last subframe.

In step 420, the processor 105 completes the transmission that is scheduled prior to the gap of no transmission. In step 425, the processor 105 is placed from the active power mode to the resting power mode. In step 430, the processor 105 waits until the determined subframe in which the reference symbols are to start being received, specifically to the OFDM symbol of the determined subframe. Once this time has lapsed, in step 430, the processor 105 is awoken to the active power mode for the reference symbols to begin being received in step 440. Subsequently, in step 440, the processor 105 performs the calculations of the wireless properties based upon N number of final reference symbols that are received (as determined in step 410). In this manner, the processor 105 is maintained in the resting power mode until the OFDM symbol having a first one of the N reference symbols inserted therein is reached.

For example, when the gap of no transmission is from subframes 204-208, the number of reference symbols may be two as the gap is of 3 ms in duration. Accordingly, after the scheduled transmission in frame 202, the processor 105 is placed into the resting power mode. This power mode is used until the seventh OFDM symbol of the last subframe 208. With two reference symbols to be received, the seventh OFDM symbol of the last subframe 208 is for the first reference symbol and the eleventh OFDM symbol of the last subframe 208 is for the second reference symbol. The following frame is when a transmission is performed.

In another example, when the gap of no transmission is 20 ms in duration, the number of reference symbols may be seven as this may represent a very large duration of the gap. Accordingly, after a scheduled transmission is performed, the processor 105 is placed into the resting power mode from the first OFDM symbol of the twenty subframes (20 ms duration). The processor 105 may use this power mode until the fourth OFDM symbol of the nineteenth subframe of the gap. With each subframe including four possible reference symbols inserted therein, seven reference symbols would therefore relate to two subframes: a first four reference symbols being included in the last subframe (twentieth subframe) and a remaining three reference symbols being included in the second to last subframe (nineteenth subframe). In the fourth, seventh, and eleventh OFDM symbols of the nineteenth subframe, first, second, and third of the seven reference symbols may be received; and in the zero-th, fourth, seventh, and eleventh OFDM symbols of the twentieth subframe, the other four of the seven reference symbols may be received.

Using the method 400, the processor 105 calculating the wireless properties may ensure that the hardware/software processing is deactivated for a longer period of time as the processor 105 may be placed into the resting power mode immediately after a scheduled transmission. The use of the last N reference symbols to update the channel estimation and the physical loops provides a most accurate and updated information on the channel immediately prior to a first OFDM symbol of a scheduled transmission. The adaptive manner of using one to N reference symbols also provides a manner of maintaining a particular amount of accuracy with regard to the calculations based upon the length of the gap of no transmission.

The exemplary embodiments provide a system and method of providing a manner to calculate wireless properties which conserves power relative to a continuous monitoring of the wireless properties but improves accuracy of the calculations relative to complete deactivation of processing during a gap of no transmission and relying upon previously received reference symbols. In a first example, when the gap of no transmission is a first range of durations (less than a predetermined duration), the calculations of the wireless properties may be based upon a reference symbol received in a zero-th OFDM symbol of the first subframe of the gap and a reference symbol received in the eleventh OFDM symbol of the last subframe of the gap. The processor may be placed into a first power mode (resting power mode) between these OFDM symbols to conserve power. In a second example, when the gap of no transmission is a second range of durations (greater than the predetermined duration), the calculations of the wireless properties may be based upon the reference symbol received in the zero-th OFDM symbol of the first subframe of the gap, at least one further reference symbol received in a OFDM symbol of an intermediary subframe of the gap, and the reference symbol received in the eleventh OFDM symbol of the last subframe of the gap. The processor may be placed into the first power mode between each OFDM symbol to conserve power. In a third example, depending on a duration of the gap of no transmission, the calculations of the wireless properties may be based upon a number of N final, consecutive reference symbols. The processor may be placed in the first power mode from the end of a scheduled transmission until the OFDM symbol of the subframe in which the first of the Nth reference symbols may be received (the Nth reference symbol being the eleventh OFDM symbol of the last subframe of the gap).

Those skilled in the art will understand that the above-described exemplary embodiments may be implemented in any suitable software or hardware configuration or combination thereof. An exemplary hardware platform for implementing the exemplary embodiments may include, for example, an Intel® x86 based platform with compatible operating system, a Mac® platform, Mac OS®, iOS®, Android OS™, etc. In a further example, the exemplary embodiments of the above described method may be embodied as a program containing lines of code stored on a non-transitory computer readable storage medium that, when compiled, may be executed on a processor or microprocessor.

It will be apparent to those skilled in the art that various modifications may be made in the present invention, without departing from the spirit or the scope of the invention. Thus, it is intended that the present invention cover modifications and variations of this invention provided they come within the scope of the appended claims and their equivalent.

What is claimed is:

1. A method, comprising:
at a station:
determining a set of consecutive subframes in which no transmission is scheduled;
when the set of consecutive subframes has a time duration greater than a predetermined threshold,
determining at least one intermediary subframe, in the set of consecutive subframes, in which at least one reference symbol is to be received,
receiving a first reference symbol in a first subframe of the set of consecutive subframes,
after receiving the first reference symbol, placing a processor into a resting power mode,
when the intermediary subframe is reached, placing the processor into a second power mode,
receiving a second reference symbol, during the at least one intermediate subframe, when the processor is in the second power mode; and
calculating a wireless property based on the first and second reference symbols.

2. The method of claim 1, wherein the wireless property is one of a channel estimate, a channel estimation track, a time tracking loop, and a frequency tracking loop.

3. The method of claim 1, further comprising:
determining a duration of the set of subframes.

4. The method of claim 3, further comprising:
receiving a third reference symbol in a portion of a first one of the set of subframes prior to placing the processor into the first power mode.

5. The method of claim 4, wherein the first and third reference symbols are used to calculate the wireless property when the duration of the set of subframes is less than a predetermined duration.

6. The method of claim 5, wherein the first, second and third reference symbols are used to calculate the wireless property when the duration of the set of subframes is greater than the predetermined duration.

7. The method of claim 1, further comprising:
determining a number of further reference symbols to be received based upon the duration of the set of subframes, the further reference symbols being received in further portions of the last subframe,
wherein the first reference symbol and the at least one further reference symbol is used to calculate the wireless property.

8. The method of claim 7, wherein, when the number of further reference symbols is greater than a predetermined amount, the further reference symbols are further received in portions of at least one immediately prior subframe relative to the last subframe.

9. A station, comprising:
a transceiver configured to establish a connection to a network, the transceiver further configured to receive reference symbols from the network; and
a processor coupled to a memory, wherein the processor is programmed to calculate a wireless property by:
determining a set of consecutive subframes in which no transmission is scheduled;
when the set of consecutive subframes has a time duration greater than a predetermined threshold,
determining at least one intermediary subframe, in the set of consecutive subframes, in which at least one reference symbol is to be received,
receiving a first reference symbol in a first subframe of the set of consecutive subframes,
after receiving the first reference symbol, placing a processor into a resting power mode,
when the intermediary subframe is reached, placing the processor into a second power mode,
receiving a second reference symbol, during the at least one intermediate subframe, when the processor is in the second power mode; and
and
calculating a wireless property based on the first and second reference symbols.

10. The station of claim 9, wherein the wireless property is one of a channel estimate, a channel estimation track, a time tracking loop, and a frequency tracking loop.

11. The station of claim 9, wherein the processor calculates the wireless property by:
determining a duration of the set of subframes.

12. The station of claim 11, wherein the processor calculates the wireless property by:
receiving a third reference symbol in a portion of a first one of the set of subframes prior to placing the processor into the first power mode.

13. The station of claim 12, wherein the first and third reference symbols are used to calculate the wireless property when the duration of the set of subframes is less than a predetermined duration.

14. The station of claim 13, wherein the first, second and third reference symbols are used to calculate the wireless property when the duration of the set of subframes is greater than the predetermined duration.

15. The station of claim 9, wherein the processor calculates the wireless property by:
determining a number of further reference symbols to be received based upon the duration of the set of subframes, the further reference symbols being received in further portions of the last subframe,
wherein the first reference symbol and the at least one further reference symbol is used to calculate the wireless property.

16. The station of claim 15, wherein, when the number of further reference symbols is greater than a predetermined amount, the further reference symbols are further received in portions of at least one immediately prior subframe relative to the last subframe.

17. A non-transitory computer readable storage medium including a set of instructions executable by a processor, wherein executing the instructions causes the processor to:
determine a set of consecutive subframes in which no transmission is scheduled;
when the set of consecutive subframes has a time duration greater than a predetermined threshold,
determining at least one intermediary subframe, in the set of consecutive subframes, in which at least one reference symbol is to be received,
receiving a first reference symbol in a first subframe of the set of consecutive subframes,
after receiving the first reference symbol, placing a processor into a resting power mode,
when the intermediary subframe is reached, placing the processor into a second power mode,
receiving a second reference symbol, during the at least one intermediate subframe, when the processor is in the second power mode; and
and
calculate a wireless property based on the first and second reference symbols.

18. The non-transitory computer readable storage medium of claim 17, wherein the set of instructions further cause the processor to:
determine a duration of the set of subframes; and
receive a third reference symbol in a portion of a first one of the set of subframes prior to placing the processor into the first power mode.

19. The non-transitory computer readable storage medium of claim 18, wherein the first and third reference symbols are used to calculate the wireless property when the duration of the set of frames is less than a predetermined duration, and wherein the first, second and third reference symbols are used to calculate the wireless property when the duration of the set of subframes is greater than the predetermined duration.

20. The non-transitory computer readable storage medium of claim 17, wherein the set of instructions further cause the processor to:
determine a number of further reference symbols to be received based upon the duration of the set of subframes, the further reference symbols being received in further portions of the last subframe,
wherein the first reference symbol and the at least one further reference symbol is used to calculate the wireless property,
wherein, when the number of further reference symbols is greater than a predetermined amount, the further reference symbols are further received in portions of at least one immediately prior subframe relative to the last subframe.

* * * * *

UNITED STATES PATENT AND TRADEMARK OFFICE
CERTIFICATE OF CORRECTION

PATENT NO. : 9,848,347 B2  
APPLICATION NO. : 14/496950  
DATED : December 19, 2017  
INVENTOR(S) : Tabet et al.

Page 1 of 1

It is certified that error appears in the above-identified patent and that said Letters Patent is hereby corrected as shown below:

In the Claims

Claim 9, Column 12, Lines 62-65 should be replaced with the following Lines:
"least one intermediate subframe, when the processor is in the second power mode; and calculating a wireless property based on the first and"

Claim 17, Column 14, Lines 9-11 should be replaced with the following Lines:
"the second power mode; and calculate a wireless property based on the first and second"

Signed and Sealed this
Twenty-eighth Day of May, 2019

Andrei Iancu
*Director of the United States Patent and Trademark Office*